United States Patent [19]

Neumaier et al.

[11] Patent Number: 4,691,929

[45] Date of Patent: Sep. 8, 1987

[54] DRILL BIT CHUCK FOR DRILLING AND CUTTING DEVICES

[75] Inventors: Anton Neumaier, Fürstenfeldbruck; Hans-Jürgen Hoereth, Langenbach; Gerhard Rumpp, Inning, all of Fed. Rep. of Germany

[73] Assignee: Hilti Aktiengesellschaft, Liechtenstein

[21] Appl. No.: 929,919

[22] Filed: Nov. 12, 1986

[30] Foreign Application Priority Data

Nov. 11, 1985 [DE] Fed. Rep. of Germany ....... 3539912

[51] Int. Cl.[4] .............................................. B23B 31/10

[52] U.S. Cl. .................................. 279/19.3; 279/1 B; 279/19.4; 279/81

[58] Field of Search ....................... 279/19, 19.3, 19.4, 279/19.6, 19.7, 1 B, 22, 30, 74, 75, 78, 80, 81, 82; 409/234; 408/226

[56] References Cited

U.S. PATENT DOCUMENTS

| | | | |
|---|---|---|---|
| 3,985,368 | 10/1976 | Bettes et al. | 279/75 |
| 4,107,949 | 8/1978 | Wanner et al. | 279/1 B |
| 4,131,165 | 12/1978 | Wanner et al. | 279/19.3 |
| 4,502,824 | 3/1985 | Dohse et al. | 409/234 |
| 4,626,146 | 12/1986 | Neumaier | 279/82 |

FOREIGN PATENT DOCUMENTS

| | | | |
|---|---|---|---|
| 778944 | 11/1980 | U.S.S.R. | 279/1 B |

*Primary Examiner*—Gil Weidenfeld
*Assistant Examiner*—Daniel W. Howell
*Attorney, Agent, or Firm*—Toren, McGeady & Associates

[57] ABSTRACT

A tool chuck for securing a tool bit in a drilling and cutting device includes a guide tube into which the tool bit is inserted and an adjusting sleeve displaceable relative to the guide tube. The guide tube has spaced first and second apertures with the first apertures holding locking members and the second apertures holding entrainment strips. The adjusting sleeve has alternating first and second pockets in its inside surface for receiving the locking members and the entrainment strips. With a tool bit having slots for both the locking members and the entrainment strip, both the locking members and entrainment strips can be displaced radially inwardly by the adjusting sleeve. If the tool bit has only slots for the locking members, the locking action can be effected with the entrainment strips maintained radially outwardly from the tool bit.

8 Claims, 7 Drawing Figures

DRILL BIT CHUCK FOR DRILLING AND CUTTING DEVICES

BACKGROUND OF THE INVENTION

The present invention is directed to a tool bit chuck for securing a tool bit having an insertion end with at least one axially extending slot closed at the opposite ends transversely of the axial direction and at least one axially extending slot which is opened at the end of the tool bit inserted into the chuck. The tool bit chuck includes a guide sleeve with first apertures for locking members displaceable by an axially displaceable or rotatably displaceably adjusting sleeve for directing the locking members radially inwardly into the closed ended slots in the tool bit. In addition, the adjusting sleeve can displace entrainment strips radially inwardly through second apertures in the guide tube into the open ended slots in the tool bit.

Tool chucks of the above type are used mainly in hammer drills in which a tool bit can be operated for one of or the combination of rotational and percussive movement. In such a tool chuck, the tool bit is supported in the guide tube so that it rotates with the tube, however, it can effect limited axial movement relative to the guide tube.

In actual practice, tool bits have been widely used which are equipped with at least one axially extending slot closed at its opposite ends and at least one separate axially extending slot open at the end of the tool bit inserted into the chuck. In a tool chuck for such tool bits the open end axially extending slots serve to receive entrainment strips mounted in the guide tube for transmitting rotational movement from the guide tube to the tool bit. The locking members in the closed-ended slots serve only to secure the tool bit in the tool chuck. Such tool bits and tool chucks adapted to receive them have proved to be particularly effective where higher torques are developed, since it is possible to separate the functions of rotational entrainment and axial retention. This separation of functions is not available in the common type of tool bit with only at least one closed-ended axially extending slot. This known type of tool bit is unsuitable for higher torques. To eliminate the shortcomings with such known tool bits, tool bit chucks with entrainment strips have found increasing acceptance in hammer drills. There is the disadvantage, however, that the generally used tool bits with only at least one closed-ended axially extending slot can not be utilized in such chucks.

SUMMARY OF THE INVENTION

Therefore, the primary object of the present invention is to provide a tool chuck with both locking members and entrainment strips suitable for receiving tool bits with both closed-ended and open end slots or recesses as well as tool bits with only closed ended slots.

In accordance with the present invention, the entrainment strips are radially displaceable.

Due to the arrangement of the tool chuck embodying the present invention the radially displacement entrainment strips can be maintained in the radially disengaged position. As a result, tool bits having only closed-ended axially extending slots or grooves can be used in the drill chuck. If, however, tool bits are used including axially extending slots open at the insertion end of the tool bit, the entrainment strips can be radially displaced inwardly into engagement with the slots in the tool bit passing through the apertures in the guide tube.

For a compact structure of the tool chuck, the entrainment strips are radially displaceable by means of the adjusting sleeve. Accordingly, on one hand, the adjusting sleeve serves for the radial displacement of the locking members, and on the other hand, for the radial displacement of the entrainment strips. Both functions can be effected by different movements such as by an axial displacement and rotational displacement of the adjusting sleeve.

During radial disengagement of the entrainment strips and the locking members, the portions of the entrainment strips and the locking members projecting in the engaged position through the receiving apertures in the guide tube must be capable of radially outward movement relative to the guide tube. For such displacement it is advantageous that the adjusting sleeve has alternating pockets for receiving the entrainment strips and the locking members during radial disengagement. Depending on the arrangement of the entrainment strips and the locking members the alternating pockets or recesses can be arranged consecutively in the axial direction or one following the other in the circumferential direction. If tool bits containing only closed-ended axially extending slots are to be inserted into the tool chuck, then only the locking members can be placed in the engaged position. If, tool bits with both closed-ended and open end axially extending slots are inserted into the tool chuck, then both the locking members and the entrainment strips must be moved into the radial engaged position. To effect such radial displacement of both parts, it is appropriate that the alternating pockets are arranged, when the adjusting sleeve is moved in the locking direction, so that first the locking members and subsequently the entrainment strips are radially displaced. During the unlocking operation, a reverse movement takes place with the entrainment strips being displaced radially initially and subsequently the locking members moving out of the locked position. When a tool bit is being changed, it is necessary to continue the unlocking operation until the entrainment strips and then the locking members are released.

For the simple operation of the tool chuck it is advantageous that the adjusting sleeve is rotatable and the alternating pockets for the entrainment strips have a greater angular extent than the pockets for the locking members. As a result, when the adjusting sleeve is rotated the entrainment strips can be radially disengaged into the receiving pockets, while the locking members remain engaged. If the rotational movement of the adjusting sleeve is continued, then the locking member can be radially disengaged into the receiving pockets for them in the adjusting sleeve.

To radially displace the entrainment strips and the locking members, the adjusting sleeve can be rotated directly. While a relatively large angle of rotation is required for this purpose, such a large angle is not favorable for the operator. For good operability of the tool chuck it is desirable to employ a shifting cam for the relative movement of the adjusting sleeve with respect to the guide tube. Such a shifting cam can be provided with a helical shape so that the adjustment sleeve moves axially at the same time that it rotates. In another embodiment the shifting cam can have a stepped shape whereby, initially, the adjusting sleeve is rotated through a portion of its entire rotational travel for the radial engagement and disengagement of the locking members. The additional rotation of the adjusting sleeve for the radial engagement and disengagement of the entrainment strips can be effected only after an axial displacement of the adjusting sleeve is performed.

The adjusting sleeve can be held in the engaged position of the locking members and the entrainment strips by a spring element. To achieve disengagement of the locking members and the entrainment strips, the biasing force of the spring element must be overcome. To facilitate the operability of the tool chuck when replacing tool bits, it is advantageous for the adjusting sleeve to be lockable in at least one end position. The locking action can be achieved by a detent element, for instance, for retaining the adjusting sleeve in the unlocked or released position. After the tool bit has been replaced, the adjusting sleeve can be returned into its locking position by overcoming the detent element.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
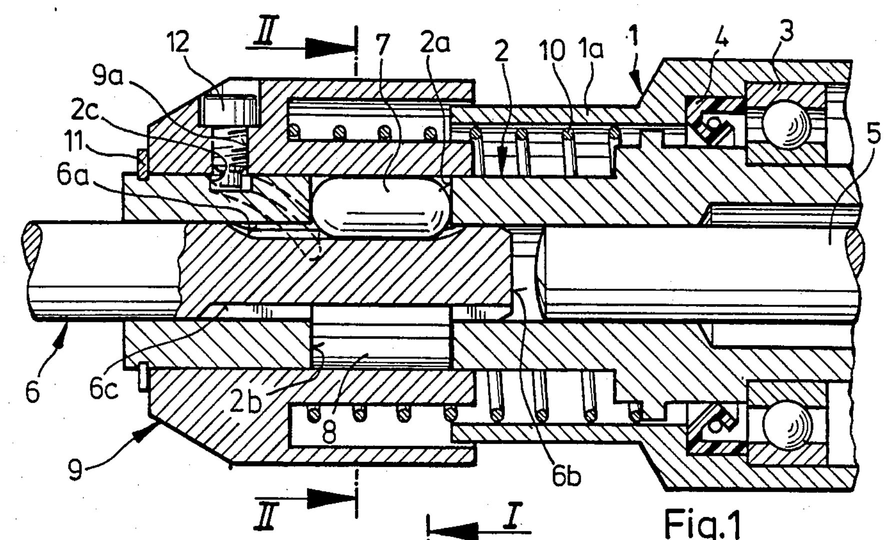
FIG. 1 is an axially extending sectional view of a tool chuck embodying the present invention mounted on a device, shown only partially, with the view taken along the line I—I in FIG. 2 and with the chuck in the locked position.

In FIGS. 1 to 5 a tool chuck is shown arranged on the front end of a device including a housing 1. An axially extending guide tube 2 is rotatably supported by a bearing 3 within the housing 1 and the guide tube extends axially out of the front end of the housing. Axially inwardly of the end of the housing 1 a sealing ring 4 encircles and contacts the outside surface of the guide tube 2 for preventing the passage of any contaminants into the bearing 3 and also preventing any leakage of lubricants out of the housing. Within the guide tube 2 is an axially extending anvil 5, shown only in part, and the anvil is axially displaceable. A trailing end or insertion end 6 of a tool bit is positioned within the front end of the guide tube 2. Within the guide tube 2, the insertion end 6 has two axially extending closed ended slots *6a* located diametrically opposite one another and two axially extending slots *6c* each open at the trailing end *6b* of the tool bit with the open end slots also located diametrically opposite one another. Note the arrangement of these slots shown in FIG. 2. The guide tube 2 has radially extending apertures *2a* in which roller-shaped locking members 7 are positioned. Further, guide tube 2 has similarly extending apertures *2b* for holding entrainment strips 8.

Figure 2:
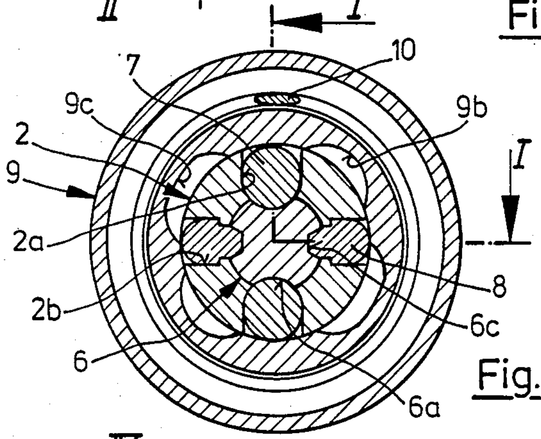
FIG. 2 is a cross-sectional view of the tool chuck shown in FIG. 1 taken along the line II—II.

In the engaged position of the tool bit insertion end 6 illustrated in FIGS. 1 and 2, locking members 7 extend into the closed end axially extending slots *6a* and the entrainment strips 8 project into the open end axially extending slots *6c*. Locking members 7 provide the axial retention of the insertion end 6 of the tool bit while the entrainment strips 8 transmit the torque from the guide tube 2 to the insertion end of the bit. Laterally encircling and in surface contact with the outside of the guide tube 2 is an adjusting sleeve 9 which is rotatable as well as axially displaceable relative to the guide tube.

In the position shown in FIG. 1, the adjusting sleeve 9 is biased by a spring 10 in the forward direction against a snap ring 11 seated in the outside surface of the guide tube 2. Adjusting sleeve 9 has a radially extending threaded bore *9a* in which an adjustment or set screw 12 is threaded. The adjustment screw 12 has a pin-shaped portion at its radial inner end extending into a control groove *2c* formed in the guide tube 2. In FIG. 1 the control groove *2c* is shown in dashed lines and in FIG. 6 it is shown in full lines. Due to the cooperation of the adjustment screw 12 with the control groove *2c*, a partial rotational movement of the adjusting sleeve 9 occurs as it is moved axially over the front end of the housing 1.

Figure 5:
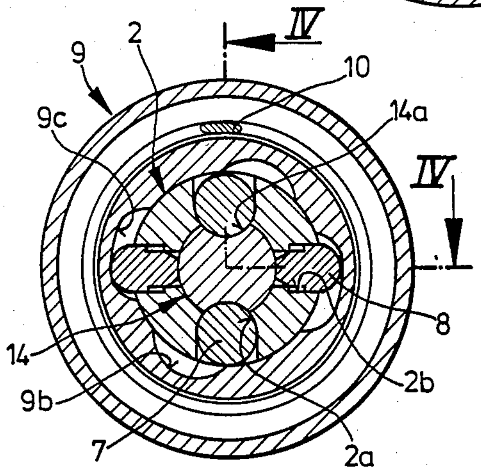
FIG. 5 is a cross-sectional view through the tool chuck illustrated in FIG. 4 and taken along the line V—V.
Figure 3:
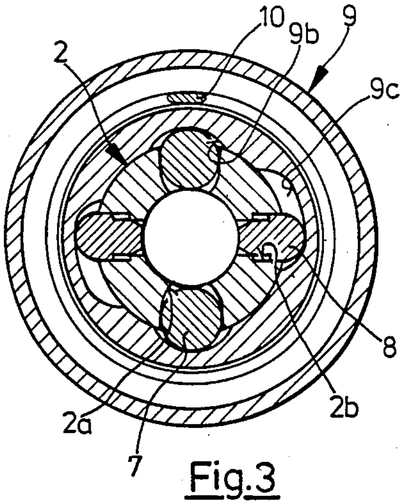
FIG. 3 is a cross-sectional view similar to that shown in FIG. 2, however, displaying the tool chuck in the unlocked position.

As can be noted in particular in FIGS. 2, 3 and 5, the adjusting sleeve 9 has alternating pockets *9b* and *9c* in its inside surface. The alternating pockets *9b* serve to receive the locking members 7 and the other pockets *9c* which have a larger angular extent in the circumferential direction are arranged to receive the entrainment strips 8. When the adjusting sleeve 9 is pulled toward the housing from the position shown in FIG. 1, it is turned in the counterclockwise direction.

As displayed in FIG. 5, the pockets *9c* initially arrive in the range of the entrainment strips 8. Accordingly, the entrainment strips 8 can be disengaged from the tool bit and move radially outwardly through the apertures in the guide tube 2. If the adjusting sleeve is turned further into the position shown in FIG. 3, the pockets *9b* move into the range of the locking member 7 so that the locking members can move radially outwardly out of engagement with the tool bit insertion end 6. As a result, the insertion end 6 of the tool bit is released and can be pulled out of the guide tube 2.

Figure 4:
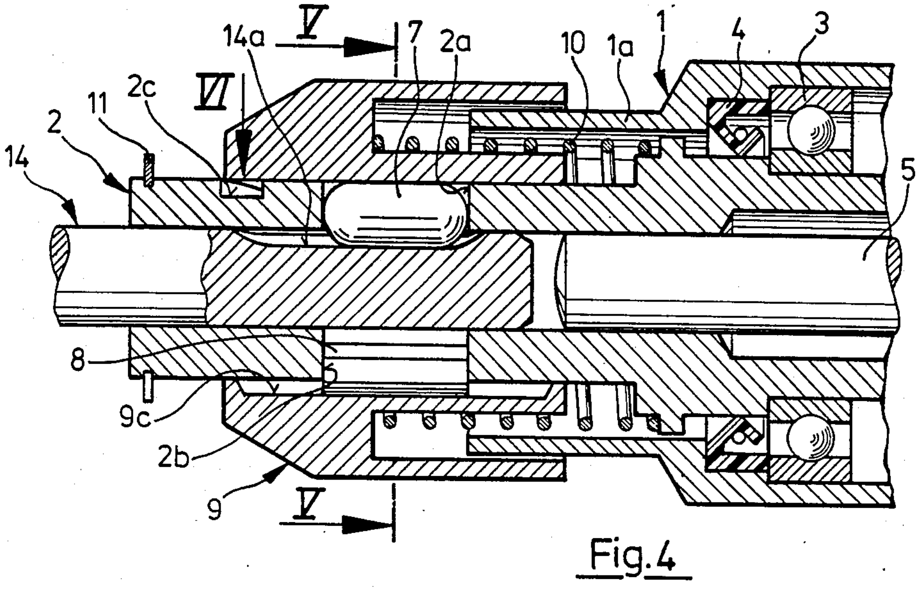
FIG. 4 is a cross-sectional view of a tool chuck as shown in FIG. 1, however, with a different tool bit inserted into the locked position in the chuck.

In FIGS. 4 and 5 an insertion end 14 of a tool bit is shown inserted into the guide tube 2. Insertion end 14 differs from the insertion end 6 displayed in FIGS. 1-3 in that it has only the closed-ended axially extending slots *14a* and it does not have any open end slots. The locking members 7 in FIG. 4 act simultaneously for the axial retention of the insertion end 14 of the tool bit as well as for the transmission of torque from the guide tube 6. As can be clearly seen in FIG. 5, the adjusting sleeve 9 is stationary in an intermediate position. In this position, the entrainment strips 8 are retained within the pockets *9c*. The locking members 7, however, are displaced radially inwardly by the adjusting sleeve 9 into locking engagement with the slots *14a* in the insertion end 14 of the tool bit.

As displayed in particular in FIG. 4, an axial extension 1a is provided on the front end of the housing 1 and extends in a telescopic fashion into the adjusting sleeve 9 so that the extension and the sleeve combine to form a type of labyrinth seal. The labyrinth seal prevents the penetration of drilling dust or other contaminants to the location of the sealing ring 4 or the bearing 3. To replace the insertion end 14 of the tool bit, adjustment sleeve 9 must be pulled rearwardly up to the stop provided by the housing 1. In such movement, the adjusting sleeve 9 reaches the position shown in FIG. 3 permitting radial disengagement of the locking members 7 and the entrainment strips 8.

Figure 6:
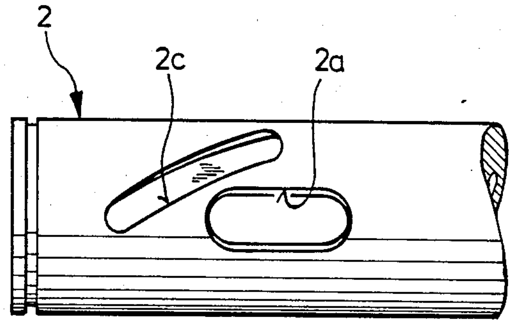
FIG. 6 is a partial side view of a part of the tool chuck illustrated in FIG. 4 and taken in the direction of the arrow VI.

FIG. 6 provides a view of the front end of the guide tube 2. In addition to the radially extending aperture 2a for the locking members 7 which aperture narrows toward the axis of the guide tube, there is also the helically extending control slot 2c mentioned above. Due to the interengagement of the control slot 2c and the adjustment screw 12, the adjustment sleeve 9 can be rotated about the axis of the guide tube as it is moved axially toward the housing 1.

Figure 7:
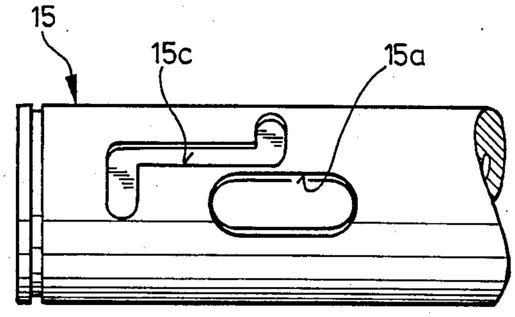
FIG. 7 is another embodiment of the tool chuck part set forth in FIG. 6.

In FIG. 7 another embodiment of a guide tube 15 is displayed. Guide tube 15 has the apertures 15a extending through it. As distinguished from the embodiment in FIG. 6, the control slot 15c in guide tube 15 is provided with a stepped configuration. Initially, by rotating the adjusting sleeve, the sleeve rotates relative to the guide tube until it reaches a stop position in the rotational direction. During such movement the entrainment strips are displaced radially outwardly. Before any further rotation of the adjusting sleeve can be effected for the disengagement of the locking members 7 from the tool bit, the adjusting sleeve must be pulled out in the axial direction toward the housing. After completing the axial movement through the control slot 15c the rotation of the adjusting sleeve 9 can be continued for releasing the locking members 7. This second embodiment has the advantage over the embodiment in FIG. 6 in that the adjusting sleeve is self-locking in the rearward position. Accordingly, in the locked position, both hands of the operator are free for replacing the tool bit.

While specific embodiments of the invention have been shown and described in detail to illustrate the application of the inventive principles, it will be understood that the invention may be embodied otherwise without departing from such principles.

We claim:

1. Tool chuck for securing one end of an axially extending tool bit in a device for use in drilling and cutting operations, with the tool bit having at least one axially extending first slot closed at the opposite ends thereof and at least one axially extending second slot with one and thereof being open at the one end of the tool bit, wherein said tool chuck comprises an axially extending guide tube having at least one first aperture extending radially therethrough, and at least one second aperture extending radially therethrough with said first and second apertures being in spaced relation, a locking member positioned within said at least one first aperture, an entrainment strip positioned within said at least one second aperture, an axially extending adjusting sleeve closely encircling said guide tube, said adjusting sleeve having a first pocket therein arranged to receive said locking member and a second pocket arranged to receive said entrainment strip and said adjusting sleeve being displaceable relative to said guide tube for retaining said locking member and entrainment strip in a radially inner position in engagement with the first and second slots in the tool bit and for receiving said locking member and entrainment strip in a radially outer position in engagement with said first and second pockets out of engagement with the first and second slots in the tool bit so that the tool bit can be removed from said tool chuck.

2. Tool chuck, as set forth in claim 1, wherein said first and second pockets are shaped and dimensioned so that initially said locking member is displaced radially inwardly and subsequently said entrainment strip is displaced radially inwardly into locking engagement with said first and second slots in the tool bit.

3. Tool chuck, as set forth in claim 2, wherein said adjusting sleeve is rotatable relative to said guide tube and the second pockets formed in said adjusting sleeve have a greater angular extent in the circumferential direction than said first pockets.

4. Tool chuck, as set forth in claim 1, wherein a shifting cam is formed in said guide tube, means in said adjusting sleeve extending into said shifting cam for guiding the movement of said adjusting sleeve relative to said guide tube in radially displacing said locking member and said entrainment strip.

5. Tool chuck, as set forth in claim 1, including means for locking said adjusting sleeve in at least one end position.

6. Tool chuck, as set forth in claim 1, including spring means for biasing said adjusting sleeve into the position for holding said locking member and said entrainment strip in the first and second slots of the tool bit.

7. Tool chuck, as set forth in claim 4, wherein said shifting cam comprises a helically extending control slot.

8. Tool chuck, as set forth in claim 4, wherein said shifting cam comprises a control slot having a first leg extending transversely of the axial direction of said guide tube, a second leg extending axially from said first leg, and a third leg extending transversely of the axial direction of said guide tube from the end of said second leg remote from said first leg.

* * * * *